(12) United States Patent
Carlson

(10) Patent No.: US 10,402,783 B2
(45) Date of Patent: Sep. 3, 2019

(54) METHOD OF AUTOMATICALLY RE-ORGANIZING STRUCTURED DATA IN A REPORTING SYSTEM BASED ON SCREEN SIZE BY EXECUTING COMPUTER-EXECUTABLE INSTRUCTIONS STORED ON A NON-TRANSITORY COMPUTER-READABLE MEDIUM

(71) Applicant: Microsoft Technology Licensing, LLC, Redmond, WA (US)

(72) Inventor: Jason David Carlson, Plano, TX (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1104 days.

(21) Appl. No.: 14/752,640

(22) Filed: Jun. 26, 2015

(65) Prior Publication Data
US 2015/0379470 A1     Dec. 31, 2015

Related U.S. Application Data

(60) Provisional application No. 62/017,686, filed on Jun. 26, 2014.

(51) Int. Cl.
| | | |
|---|---|---|
| *G06F 3/048* | (2013.01) | |
| *G06F 17/24* | (2006.01) | |
| *G06F 17/21* | (2006.01) | |
| *G06Q 10/10* | (2012.01) | |

(52) U.S. Cl.
CPC .................................. *G06Q 10/10* (2013.01)

(58) Field of Classification Search
CPC ..... G06F 3/0481; G06F 17/212; G06F 17/246
See application file for complete search history.

(56) References Cited

U.S. PATENT DOCUMENTS

| | | | | |
|---|---|---|---|---|
| 6,976,226 | B1 * | 12/2005 | Strong | G06F 16/9577 |
| | | | | 715/788 |
| 6,981,209 | B1 * | 12/2005 | Parikh | G06F 17/212 |
| | | | | 707/999.101 |
| 7,216,291 | B2 * | 5/2007 | Kim | G06F 17/211 |
| | | | | 715/227 |
| 7,260,777 | B2 * | 8/2007 | Fitzsimons | G06F 16/958 |
| | | | | 715/255 |
| 8,214,733 | B2 * | 7/2012 | Bastos dos Santos | |
| | | | | G06F 17/243 |
| | | | | 382/169 |
| 8,219,927 | B2 * | 7/2012 | Gatlin | G06F 3/0481 |
| | | | | 715/784 |
| 9,013,513 | B2 * | 4/2015 | Paolini | G06F 3/0483 |
| | | | | 345/672 |
| 9,087,337 | B2 * | 7/2015 | Ho | G06Q 30/02 |
| 9,760,271 | B2 * | 9/2017 | Persaud | G06F 3/0485 |

(Continued)

*Primary Examiner* — Scott T Baderman
*Assistant Examiner* — Mario M Velez-Lopez
(74) *Attorney, Agent, or Firm* — Mannava & Kang, P.C.

(57) ABSTRACT

A method of automatically re-organizing structured data in a reporting system based on screen size calculated an initial layout for data containers in a report, checks to see if any of the data containers are obscured by the right display edge, and re-arranges the data containers so that no containers are obscured. A similar process is performed on any data grids with obscured columns. Columns are removed according to importance to maintain context. Elements in a removed column are added below respective associated rows.

12 Claims, 12 Drawing Sheets

(56) References Cited

U.S. PATENT DOCUMENTS

| | | | |
|---|---|---|---|
| 2009/0164919 A1* | 6/2009 | Bates | G06Q 10/10 715/757 |
| 2009/0313537 A1* | 12/2009 | Fu | G06F 17/246 715/212 |
| 2010/0153858 A1* | 6/2010 | Gausman | G06Q 10/101 715/757 |
| 2011/0169927 A1* | 7/2011 | Mages | G06F 3/04815 348/51 |
| 2012/0159297 A1* | 6/2012 | Peters | G06F 17/246 715/212 |
| 2013/0124996 A1* | 5/2013 | Margulis | G06F 3/0484 715/719 |
| 2013/0151974 A1* | 6/2013 | Cho | G06F 17/212 715/733 |
| 2014/0215308 A1* | 7/2014 | Cantrell | G06F 16/9577 715/234 |
| 2017/0214611 A1* | 7/2017 | Cordell | G06F 17/289 |
| 2018/0247612 A1* | 8/2018 | Kikuchi | G02B 27/017 |

* cited by examiner

Sales Order
Order #: SO50750

*ADVENTURE WORKS*
CYCLES

| Bill to: | Central Discount Store<br>295286 Russel Rd, South<br>Kent, Washington 98301<br>United States | | Ship to: | Central Discount Store<br>295286 Russel Rd, South<br>Kent, Washington 98301<br>United States | | |
|---|---|---|---|---|---|---|
| Contact | Jean Handley | Purchasing manager | 582-555-0113 | | | |
| | Carina Stanev | Purchasing Agent | 597-555-0100 | | | |
| Date<br>6/22/2014 | Order Date<br>6/1/2003 | Sales Person<br>David Campbell, Sales Representative<br>740-555-0182 | | Purchase Order<br>PO7192170677 | Shipment Method<br>CARGO TRANSPORT 5 | |

| Line | Qty | Item Number | Description | Tracking # | Unit Price | Subtotal | Discount | Item Total |
|---|---|---|---|---|---|---|---|---|
| 1 | 2 | CA-1098 | AWC Logo Cap | 373D-417C-AE | $5.19 | $10.37 | $0.00 | $10.37 |
| 2 | 4 | GL-F110-M | Full-Finger Gloves | 373D-417C-AE | $22.79 | $91.18 | $0.00 | $91.18 |
| 3 | 4 | LJ-0192-L | Long-Sleeve Logo Jersey, L | 373D-417C-AE | $28.84 | $115.36 | $0.00 | $115.36 |
| 4 | 3 | GL-F110-L | Full-Finger Gloves, L | 373D-417C-AE | $22.79 | $66.38 | $0.00 | $66.38 |
| 5 | 1 | BK-M68B-42 | Mountain-200 Black, 42 | 373D-417C-AE | $1229.46 | $1229.46 | $0.00 | $1229.46 |
| 6 | 1 | TG-W091-L | Women's Tights, L | 373D-417C-AE | $44.99 | $44.99 | $0.00 | $44.99 |
| 7 | 1 | BK-M68S-38 | Mountain-200 Silver, 38 | 373D-417C-AE | $1242.85 | $1242.85 | $0.00 | $1242.85 |

Total Discount: $0.00  Total: $2802.60

Contact us:
- Phone: 800-ADVENTURE
- Email: help@adventureworks.com
- Fax: 800-555-2424

FIG. 7

Bill to:

Central Discount Store
295286 Russel Rd, South
Kent, Washington 98301
United States Ship to:

Central Discount Store
295286 Russel Rd, South
Kent, Washington 98301
United States Contact

| Jean Handley | Purchasing manager |
| Carina Stanev | Purchasing Agent |

| Date | Order Date |
| 6/22/2014 | 6/1/2003 |

Sales Person
David Campbell, Sales Representative
740-555-0182

Purchase Order
PO7192170677

Shipment Method
CARGO TRANSPORT 5

FIG. 8

Jean Handley    Purchasing manager
Carina Stanev    Purchasing Agent

Date    Order Date
6/22/2014    6/1/2003

Sales Person
David Campbell, Sales Representative
740-555-0182

Purchase Order
PO7192170677

Shipment Method
CARGO TRANSPORT 5

| Qty | Item Number | Unit Price | Item Total |
|---|---|---|---|
| ☑ 2 | CA-1098 | $5.19 | $10.37 |
| ☑ 4 | GL-F110-M | $22.79 | $91.18 |
| ☑ 4 | LJ-0192-L | $28.84 | $115.36 |
| ☑ 3 | GL-F110-L | $22.79 | $66.38 |
| ☑ 1 | BK-M68B-42 | $1229.46 | $1229.46 |
| ☑ 1 | TG-W091-L | $44.99 | $44.99 |
| ☑ 1 | BK-M68S-38 | $1242.85 | $1242.85 |
| ☑ | | | $2802.60 |

Contact us:
- Phone: 800-ADVENTURE
- Email: help@adventureworks.com
- Fax: 800-555-2424

FIG. 9

Jean Handley     Purchasing manager
Carina Stanev     Purchasing Agent

Date     Order Date
6/22/2014     6/1/2003

Sales Person
David Campbell, Sales Representative
740-555-0182

Purchase Order
PO7192170677

Shipment Method
CARGO TRANSPORT 5

| Qty | Item Number | Unit Price | Item Total |
|---|---|---|---|
| ⌃ 2 | CA-1098 | $5.19 | $10.37 |

Line
  1

Description
AWC Logo Cap

Tracking #
373D-417C-AE

Subtotal
    $10.37

Discount
    $0.00

| | | | |
|---|---|---|---|
| ⌄ 4 | GL-F110-M | $22.79 | $91.18 |
| ⌄ 4 | LJ-0192-L | $28.84 | $115.36 |

FIG. 10

|  |  |  | 2002 | | | 2003 |
| --- | --- | --- | --- | --- | --- | --- |
|  |  | Q1 | Q2 | Q3 | Q4 |  |
| ⊟ Accessories | Bike Racks |  |  |  |  | $136,804 |
|  | Bike Stands |  |  |  |  | $18,921 |
|  | Bottles and Cages |  |  |  |  | $27,822 |
|  | Cleaners |  |  |  |  | $9,862 |
|  | Fenders |  |  |  |  | $19,408 |
|  | Helmets | $4,946 | $11,639 | $33,853 | $24,871 | $208,317 |
|  | Hydration Packs |  |  |  |  | $58,687 |
|  | Locks |  |  | $6,325 | $3,780 | $6,159 |
|  | Pumps |  |  | $5,157 | $3,326 | $5,145 |
|  | Tires and Tubes |  |  |  |  | $103,889 |
| ⊟ Bikes | Mountain Bikes | $2,497,518 | $2,416,837 | $3,141,467 | $2,837,647 | $12,851,826 |
|  | Road Bikes | $3,171,788 | $3,478,964 | $4,930,693 | $4,189,622 | $15,282,929 |
|  | Touring Bikes |  |  |  |  | $7,064,592 |
| ⊞ Clothing |  | $11,712 | $20,310 | $265,585 | $192,213 | $1,024,474 |
| ⊞ Components |  | $175,044 | $376,247 | $1,935,906 | $1,123,845 | $5,489,741 |

FIG. 11

| | |
|---|---|
| ⊟ Accessories | ☑ Bike Racks |
| | ☑ Bike Stands |
| | ☑ Bottles and Cages |
| | ☑ Cleaners |
| | ☑ Fenders |
| | ☑ Helmets |
| | ☑ Hydration Packs |
| | ☑ Locks |
| | ☑ Pumps |
| | ☑ Tires and Tubes |
| ⊟ Bikes | ⊠ Mountain Bikes |
| | ⊟ 2002 |
| | Q1 |
| | $2,497,518 |
| | Q2 |
| | $2,416,837 |
| | Q3 |
| | $3,141,467 |
| | Q4 |
| | $2,837,647 |
| | ⊞ 2003 |
| | $12,851,826 |
| | ☑ Road Bikes |
| | ☑ Touring Bikes |
| ☑ ⊞ Clothing | |
| ☑ ⊞ Components | |

FIG. 12

METHOD OF AUTOMATICALLY RE-ORGANIZING STRUCTURED DATA IN A REPORTING SYSTEM BASED ON SCREEN SIZE BY EXECUTING COMPUTER-EXECUTABLE INSTRUCTIONS STORED ON A NON-TRANSITORY COMPUTER-READABLE MEDIUM

The current application claims a priority to the U.S. Provisional Patent application Ser. No. 62/017,686 filed on Jun. 26, 2014.

FIELD OF THE INVENTION

The present invention relates generally to arrangement of data. More particularly, the present invention relates to automatic re-layout of structured data.

BACKGROUND OF THE INVENTION

A report is the runtime result of merging a report definition with data producing a visual output. Reports are generally designed with a specific screen size in mind, much like paper size in the past. Using a screen size larger or smaller is less efficient or in many cases completely unusable. To address this inherit problem, report writers must produce several different layouts based on screen size. State of the art responsive layout solutions do not work because it is critical that the data stay in context with the original design. Improper re-layout can lead to misinterpretation of the data and negate the purpose of the report.

There are many of different strategies for implementing a responsive solution using code or templates for static websites. The present invention is a system that focuses on automatic re-layout in a reporting solution where there is an abstract definition of the report that is merged with data at runtime. Therefore the actual amount of data and final layout is not known until runtime.

BRIEF DESCRIPTION OF THE DRAWINGS

FIG. 7 is an example image of a report before is has been automatically laid out. The screenshot image shows free form layout of elements, containers and a data grid.

FIG. 8 is an example image that shows the top of the report re-laid out based on a smaller screen size.

FIG. 9 is an example image that shows the present invention removing the columns of the data grid based on hints so that the "Item Total" and "Unit Price" columns remain visible, while the others are moved and hidden.

FIG. 10 is an example image that shows the hidden column data row expanded with all of the hidden columns now visible for that row. Formatting of both the data and the column headers is maintained. A simplified layout with each cell group aligned vertically is used.

FIG. 11 is an example image of a data grid with multiple levels of row and column headers with expandable rows and columns. The 2002 columns header is expanded as is the Accessories and Bikes row headers.

FIG. 12 is an example screenshot image that shows multiple levels of row headers and an expanded column data row that contains dynamic columns. The dynamic columns may still be expanded independently and expand vertically instead of horizontally.

DETAIL DESCRIPTIONS OF THE INVENTION

Figure 1:
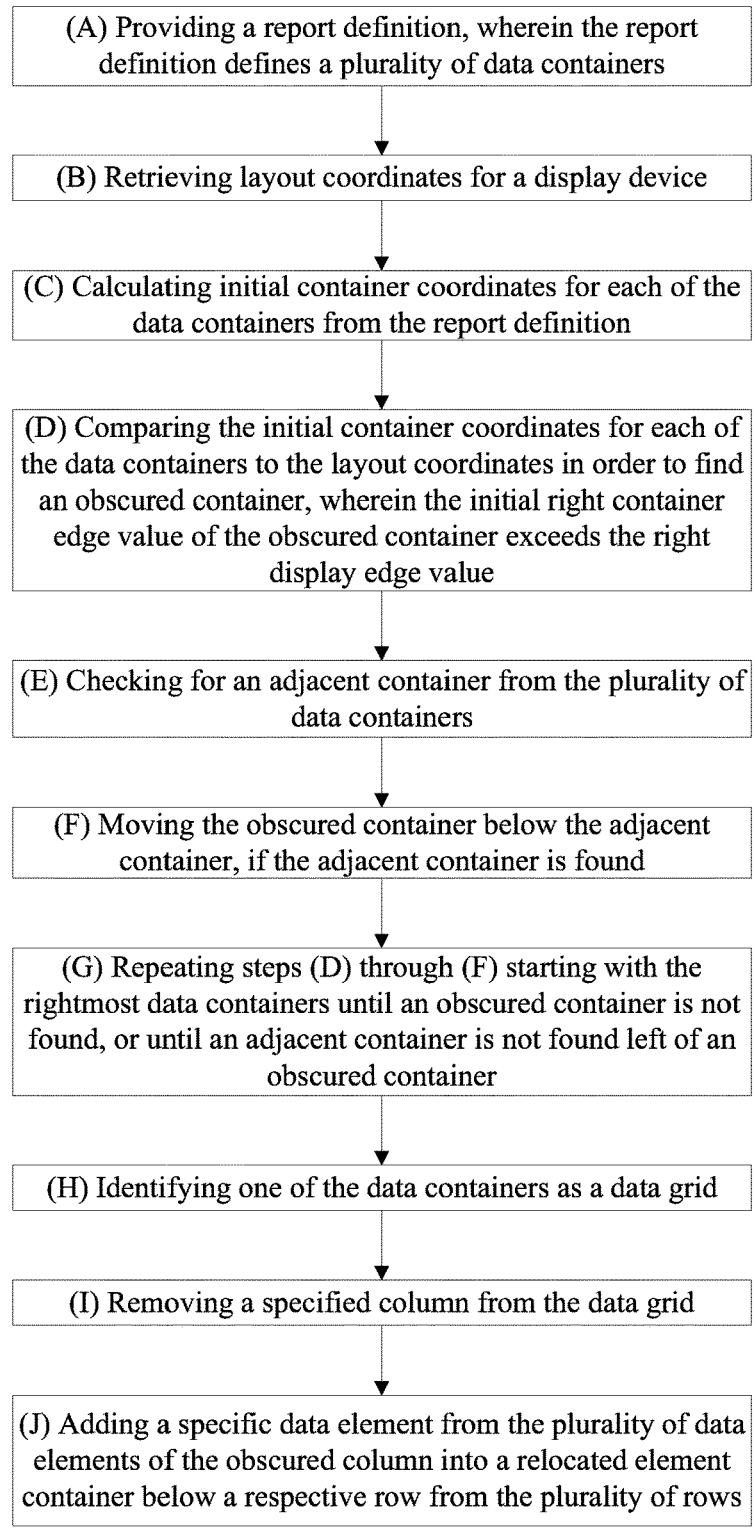
FIG. 1 is a stepwise flow diagram of the general process of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a method for automatic re-layout of structured data in a reporting system based on screen size. The present invention implements a responsive layout on dynamic data maintaining the context and structure of the original, or intended layout. In the present invention, two principal steps are executed to provide automatic and optimal viewing of the data without losing context leading to misinterpretation. The first principal step is to re-layout all elements of the data report to be visible within the boundaries of a display without having to scroll to the right. The second step is to re-layout cells within any data grids so that the most important information in the data grid is displayed.

The present invention is intended to be used with a data reporting system. In a data reporting system, a report is provided comprising a plurality of data containers and data elements. Typically, the report is provided in the form of a spreadsheet or some other format which contextualizes different types of information, such as, but not limited to, vendor information, customer information, item type, item number, cost per item, number of items ordered, and so on. Each individual piece of data is regarded as a data element. Each of the data containers represents a portion of the various types and delineations of data in the report. A data container may comprise a single data element, additional nested containers, or a data container may be empty and not comprise any further data containers or data elements. Data elements are the basic building blocks of a report. Examples of data elements include, but are not limited to, text areas, charts, lines, images, containers, gauges, maps, and so on. Generally, data elements specify content to be delivered and any style information.

With the report, a report definition is also provided (A). The report definition defines the data containers and is a set of instructions for spatially arranging the data containers on a visual medium, more particularly on a digital display device. While the data elements are the content of the report, the report definition provides the intended structure and layout of the content of the report. The report definition defines the spatial arrangement of the data in the report for readability and context. The report definition is an abstract set of instructions for the layout of the data to produce a report. The report definition may contain data grouping, sorting, aggregation and other concepts. Reports are made of data elements that are laid out on a "canvas" or display. Data elements may also be grouped into data containers which may be used for context and to keep like elements together. Data containers may be nested in other data containers. It should be understood that data containers may be treated as individual data elements when nesting is used, and data elements may be understood to be analogous to a data container with a single data element.

In a non-limiting example where the report is a sales order, a report definition may instruct the computer system processing the report to display a "Bill to" data container at the top left corner of the report, with a "Ship to" data container horizontally even with the "Bill to" data container and a certain distance right of the "Bill to" data container, while data containers containing contact information for various parties and order information further down on the report, followed by a list of items purchased. FIG. 7 shows an example of such a report before re-layout.

Referring to FIG. 1, in the general process of the preferred embodiment of the present invention, device attributes including layout coordinates are retrieved for a display device (B). The display device is whatever computing device the report is viewed on, such as, but not limited to, a personal computer, tablet computer or smartphone. The layout coordinates delineate display boundaries on the display device and comprise a left display edge value, a right display edge value, a top display edge value, and a bottom display edge value. Additional coordinates or other attributes such as, but not limited to, scrolling speed, zoom capability, default font size, typeface, alignment, formatting, and other device attributes may be retrieved or specified as well. The layout coordinates are retrieved from device attributes of the display device. The storage location the device attributes are retrieved from or means of retrieval of the device attributes may vary from device to device. Herein, coordinate values should be understood to be measured from the top left corner of the display area of the display device.

Initial container coordinates for each of the data containers are calculated using the report definition and the data containers as is typical with reporting systems (C). The initial container coordinates for each of the data containers comprise an initial left container edge value, an initial right container edge value, an initial top container edge value and an initial bottom container edge value. The initial container coordinates represent the general layout of the report if the method of the present invention is not executed on the report. In common practice coordinates are specified as Top, Left, Width and Height. From these definitions, Bottom and Right values can be calculated. However, the specific convention of implementation for defining coordinates does not significantly change the present invention so long as the desired effect is achieved.

The initial container coordinates for each of the data containers are compared to the layout coordinates in order to find an obscured container (D). In order for a specific data container to be considered an obscured container, the initial right container edge value of the specific data container must exceed the right display edge value. In one embodiment of the present invention, the initial right container edge value must exceed the right display edge value by any margin to be considered an obscured container. In another embodiment, the initial left container edge value must exceed the right display edge value by a specified percentage of the data container to be considered an obscured container. In another embodiment, the initial left container edge value must exceed the right display edge value by some other calculated margin to be considered an obscured container.

An adjacent container is then checked for from the plurality of data containers (E). In the preferred embodiment, the criteria for finding an adjacent container are as follows: the initial top container edge values for the obscured container and the adjacent container are identical, and the initial right container edge value of the adjacent container is less than (or equal to in some embodiments) the initial left container edge value of the obscured container. In some embodiments the initial top container edge values of the obscured container and the adjacent container need not be identical, but close within a specified margin, or the adjacent container may be recognized by other similar criteria or means. Alternatively stated, the criteria for an adjacent container may simply comprise being left of the obscured container with some vertical overlap.

If the adjacent container is found, the obscured container is moved below the adjacent container (F). Steps (D) through (F) are repeated, starting with the rightmost data containers from the plurality of data containers until an obscured container is found, or until an adjacent container is not found left of an obscured container (G). The rightmost data containers are data containers with larger horizontal coordinate values than other data containers with identical or similar vertical coordinate values (in other words, in the same row of the report or with some vertical overlap).

Figure 2:
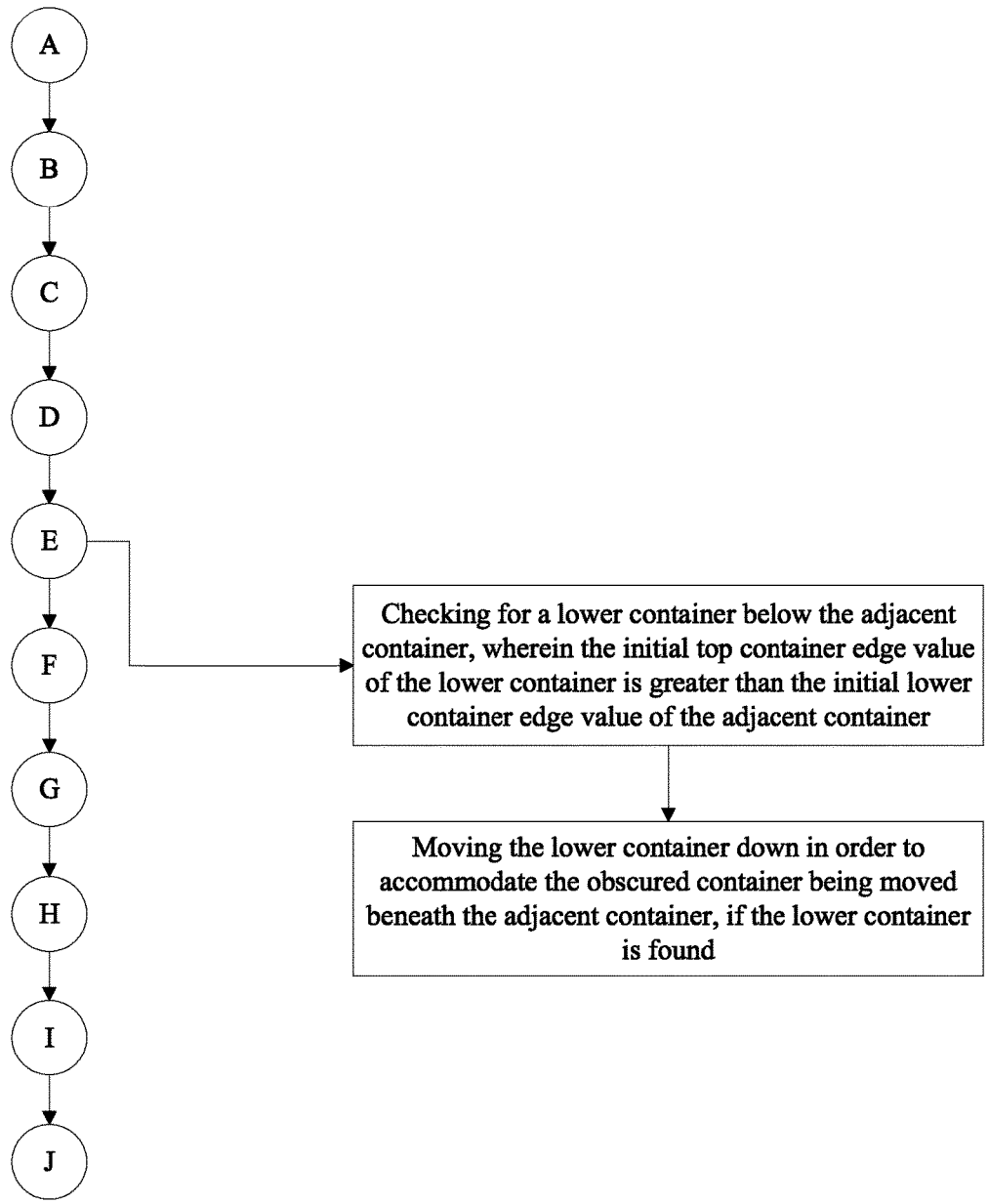
FIG. 2 is a stepwise flow diagram showing additional steps for moving data containers.

Referring to FIG. 2, in addition to moving obscured data containers left and below adjacent containers, content below the adjacent container must also be moved down to accommodate the obscured data container being moved. A lower container is checked for below the adjacent container, wherein the initial top container edge value of the lower container is greater than the initial lower container edge value of the adjacent container (i.e. the initial top container edge of the adjacent container is closer to the top of the layout coordinates than the initial top container edge of the lower container). If the lower container is found, the lower container is moved down in order to accommodate the obscured container being moved beneath the adjacent container.

Since data containers may contain other data containers, this re-layout process is repeated as many times as necessary to ensure that no elements are obscured. Data containers and data elements are treated similarly in that they both may be regarded as a single unit and moved to a new layout position. When a data container containing other data containers is moved, the other data containers maintain their position within the containing data container. After the data container is moved, the other data containers within the data containers are also checked to make sure none of the other data containers are obscured. In general, the process of the present invention is to re-layout the data containers from the outermost, or rightmost, containers first, and subsequently check inner data containers.

Figure 3:
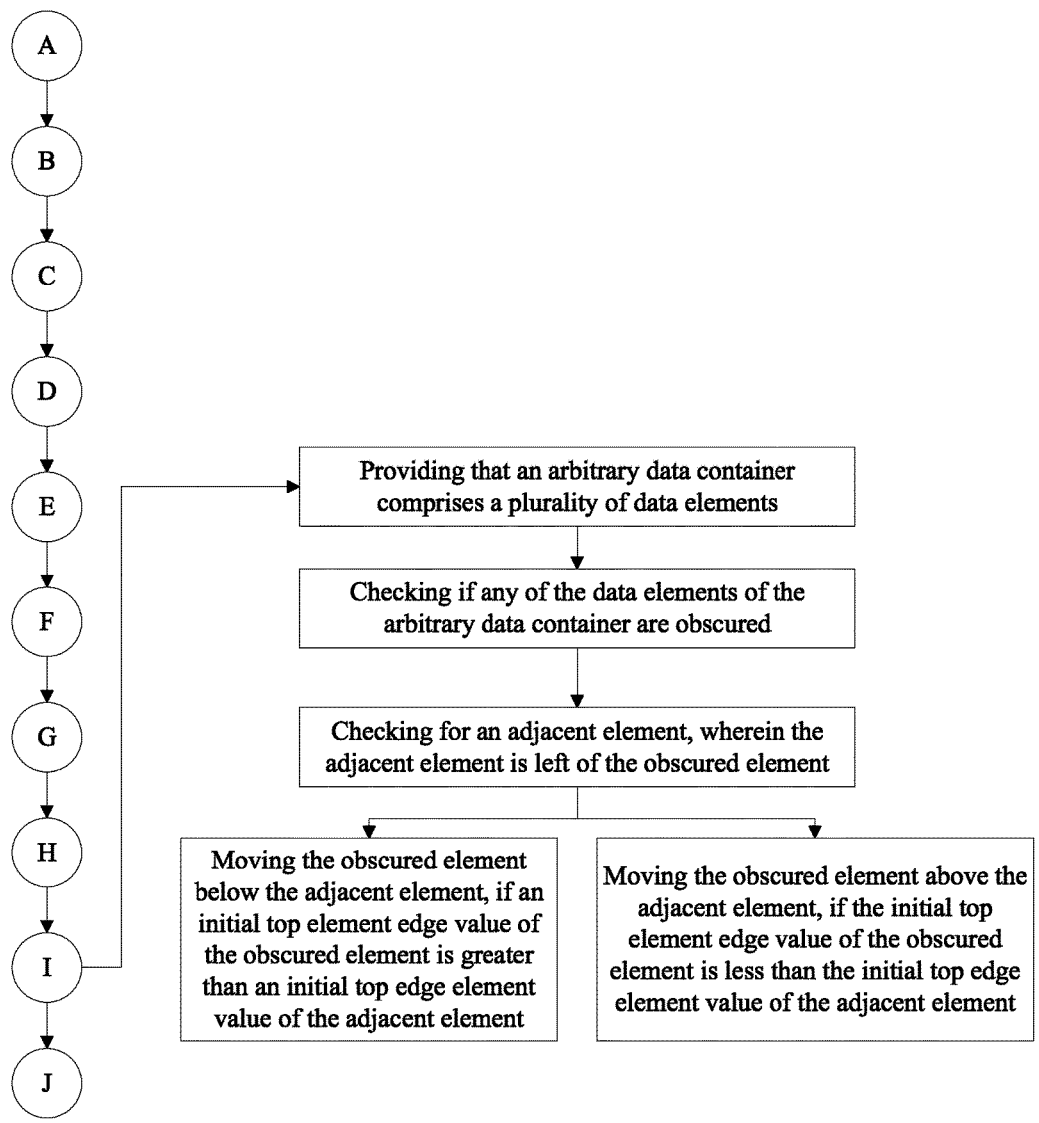
FIG. 3 is a stepwise flow diagram showing additional steps for moving data containers based on container height.

Referring to FIG. 3, a similar re-layout process may be performed on data elements within a data container. If an arbitrary data container comprises a plurality of data elements arranged within the arbitrary data container, a checking process is executed to determine if any of the data elements of the arbitrary data container are obscured. A data element is an obscured element if part of the obscured element is past the right display edge boundary. After finding an obscured element, an adjacent element is checked for, wherein the adjacent element is left of the obscured element with the same or similar vertical coordinate or some vertical overlap. The obscured element is moved below the adjacent element if an initial top element edge value of the obscured element is greater than an initial top edge element value of the adjacent element. The obscured element is moved above the adjacent element if the initial top element edge value of the obscured element is less than the initial top edge element value of the adjacent element. In general, obscured elements are moved to the left of the data container they occupy and either above or below elements initially left of the obscured element depending on context. Data elements (or data containers) that are lower than an adjacent element (elements that have a larger vertical coordinate value) are moved below the adjacent element. A data element (or data container) that is vertically level with an adjacent data element but has a larger horizontal coordinate value (is further right than the adjacent element) is moved below the adjacent element. FIG. 8 shows the report of FIG. 5 after re-layout.

Figure 4:
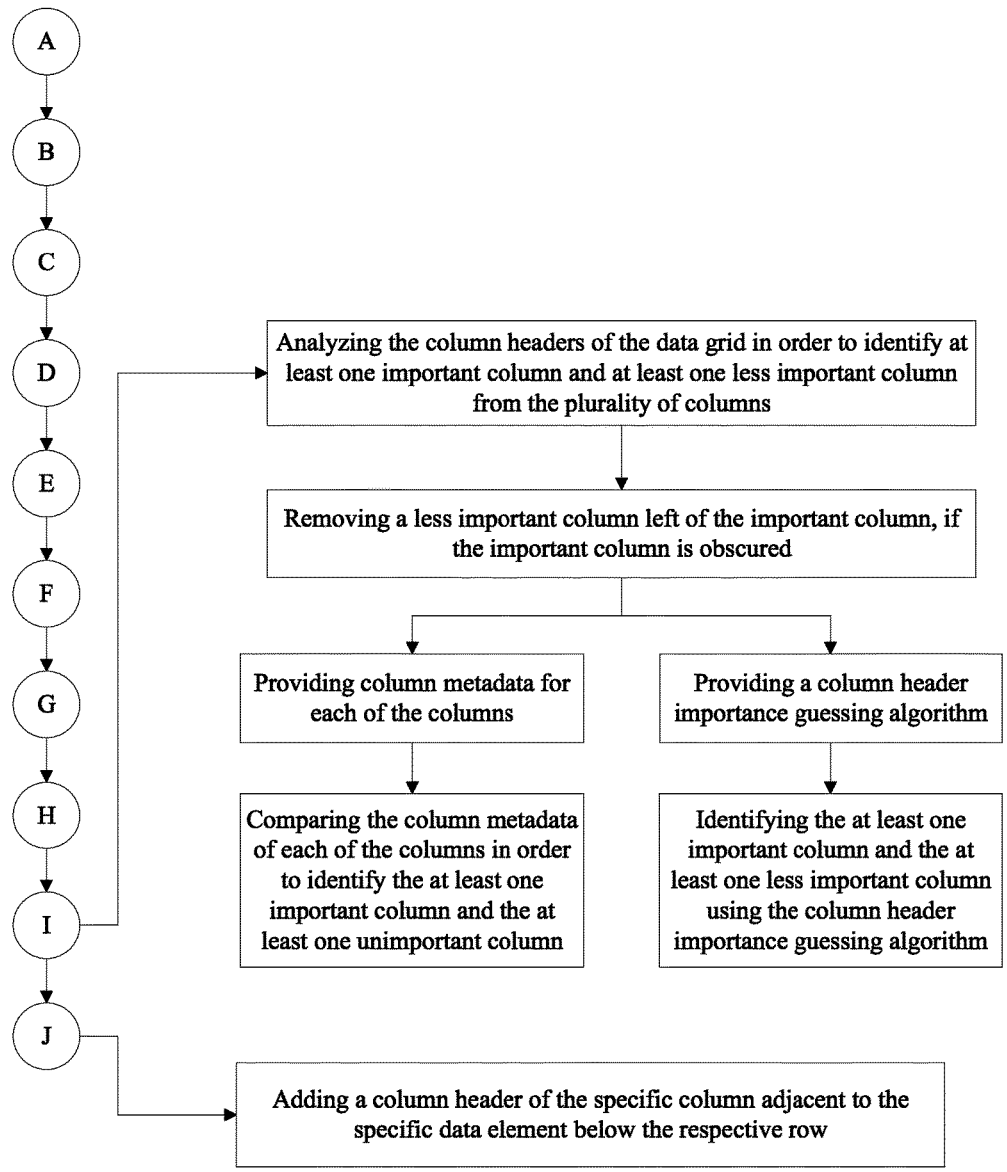
FIG. 4 is a stepwise flow diagram showing additional steps for removing columns in a data grid based on importance.

Referring to FIG. 4, in the second principal step of the present invention, the data containers are analyzed to determine if one of the data containers is a data grid. One of the data containers is identified as a data grid if specified in the report definition, or if the data container comprises a plurality of data elements arranged in a plurality of rows and a plurality of columns, or the data grid may be identified by another applicable method (H). Each data element in a data grid is associated with one of the rows from the plurality of rows and one of the columns from the plurality of columns, each data element being positioned within a cell at the intersection of one of the rows and one of the columns.

For data grids, there is a need to hide and move the cells in the grid if they are not visible. Because the data in a grid is generally very specific to the row and column it is in, there is a need to maintain its context. Since columns are moving or hiding, it must identify the column headers if any. There may be multiple levels of column headers and column headers may change multiples times based on previous rows in the grid. Cells may contain containers, if so the cell is treated as a cell and moves according to data grid rules. The container is treated as a container and is re-laid out in the cell based on element rules. A column header is a special cell within a data grid that is used to identify the rest of the data in that row or column. A data grid may have multiple levels of row and column headers. Column headers may also be dynamic and repeat throughout the data grid.

Once the data grid is identified, a re-layout operation is performed on the data grid similar to the first principal step of performing the re-layout of the data containers. The columns of the data grid are analyzed to determine if any of the columns are obscured, using similar means as in the first principal step. If an obscured column is found, a specified column is removed from the data grid (I). A column is obscured if the column is positioned right of the right display edge value similar to an obscured data container.

A specific data element from the plurality of data elements of the obscured column is then added into a relocated element container below a respective row from the plurality of rows of the data grid, wherein the specific element is associated with the respective row (J). Additionally, a column header of the specific column is added adjacently with the specific data element into the relocated element container below the respective row to maintain context. All data elements of removed columns are moved into the relocated element container for each respective row. The column headers are repeated in every new row with an added data element from the removed specific column. FIG. 9 shows the result of the re-layout of the data grid of the example report from FIG. 7.

Figure 5:
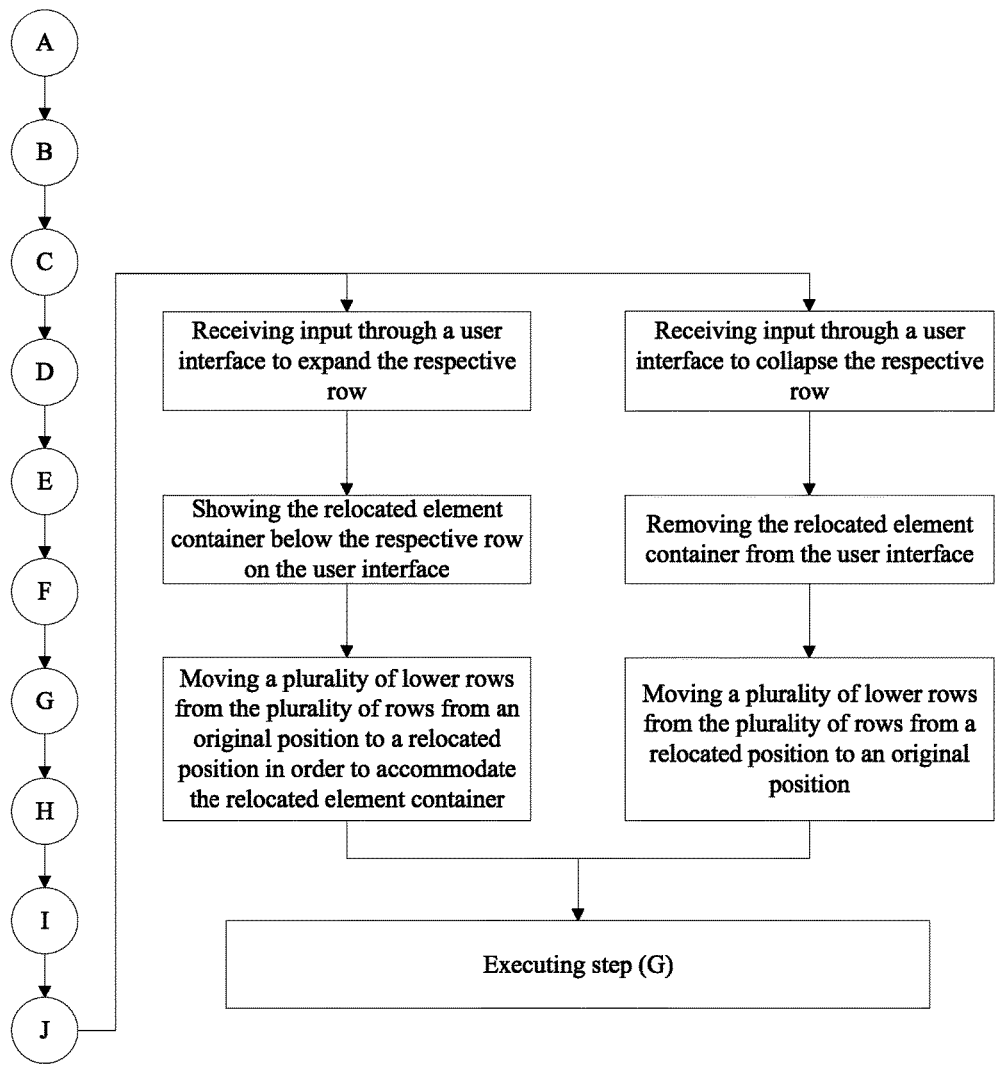
FIG. 5 is a stepwise flow diagram showing additional steps for expanding rows to show data from removed columns.

Rows of the re-laid out data grid may be expanded to show information from the removed columns, as shown in FIG. 10. More specifically, a user viewing the report on a user interface may input a selection to expand or collapse the respective row in order to view the relocated element container. Referring to FIG. 5, upon receiving input through the user interface to expand the respective row, the relocated element container is shown below the respective row on the user interface. In order to accommodate the relocated element container, a plurality of lower rows from the plurality of rows are moved from an original position to a relocated position. The lower rows are below the respective row to be expanded, and the relocated position is lower than the original position. This action only occurs if lower rows are found below the respective row. Alternatively, if a data container is directly below the respective row instead of lower rows, a similar action is taken to relocate the data container in order to accommodate the relocated element container. Subsequently, step (G) is executed in order to ensure the expansion of the respective row did not result in any data elements or data containers being obscured.

Similarly, upon receiving input through the user interface to collapse the respective row (if the respective row is currently expanded and the relocated element container is currently shown on the user interface) the relocated element container is removed from the user interface, and the plurality of lower rows is relocated from the relocated position back to the original position, and step (G) is again executed.

Determining the specified column depends on the context and content of the columns. The columns are analyzed to determine an importance ranking for the columns, and less important columns are removed until there are no obscured columns. If an importance ranking is not determined, the columns are removed starting from the rightmost column until no columns are obscured.

By default, columns are removed when they are not visible usually starting from the far right. In some cases it is preferable to prioritize which columns should be removed first so that the most important information is visible to the user. The system should allow the report designer to provide metadata to prioritize the order in which columns are removed.

When performing the re-layout operation of the data grid, the column headers of the data grid are analyzed in order to identify at least one important column and at least one less important column from the plurality of columns. If one of the at least one important column is obscured, a less important column is removed if the less important column is left of the obscured important column, and the obscured important column is moved left until the obscured important column is no longer obscured.

Preferably, column metadata is provided for each of the columns of the data grid. The column metadata of each of the columns is compared to each other in order to identify the at least one important column and the at least one unimportant column.

If the column metadata is not provided, a column header importance guessing algorithm is used to identify the at least one important column and the at least one less important column.

Identifying column headers is critical to maintain context. In most cases the column headers will be in the first row of data. If there is a column span in the first row, then the second row likely also contains column header data. Some reporting systems identify column headers, and use this information when available. The system may also allow the report designer to provide column header metadata to identify the column header rows. For cases where the column headers are repeated or change based on the rows in the grid the system can either rely on hits from the report designer or best guess the column headers based on heuristics repeating values in rows. If no header can be identified then the cell groups either must be ordered or include a column number in the cell group.

If a column is not visible, the column is removed from the grid and a new column data row is added for every row in the grid with the cells from the removed columns. The cells that are removed are added to the column data row with their respective column header forming a column cell group. If there are multiple levels of column headers, they may either all be repeated with each cell group or if they span multiple columns with the first cell group. The cell groups in the column data row may be arranged to make optimal use of the available width. The simplest arrangement is place each cell group below the previous cell group. FIG. 11 shows an example report comprising a data grid with nested headers. FIG. 12 shows the result of the re-layout operation on the report from FIG. 11.

In some cases, cells in a data grid may be dynamically expandable. For example, the "Accessories," "Bikes," "Clothing," "Components," "2002," and "2003" cells in FIGS. 9 and 10 are dynamically expandable. Expanding or collapsing a dynamically expandable cell adds or removes cells to the data grid in order to hierarchally display various categories of data. When a dynamically expandable cell is expanded or collapsed, cells are added or removed from the data grid. This may potentially cause cells in the data grid to become obscured, so the re-layout process must be repeated every time a dynamically expandable cell is expanded or collapsed.

Figure 6:
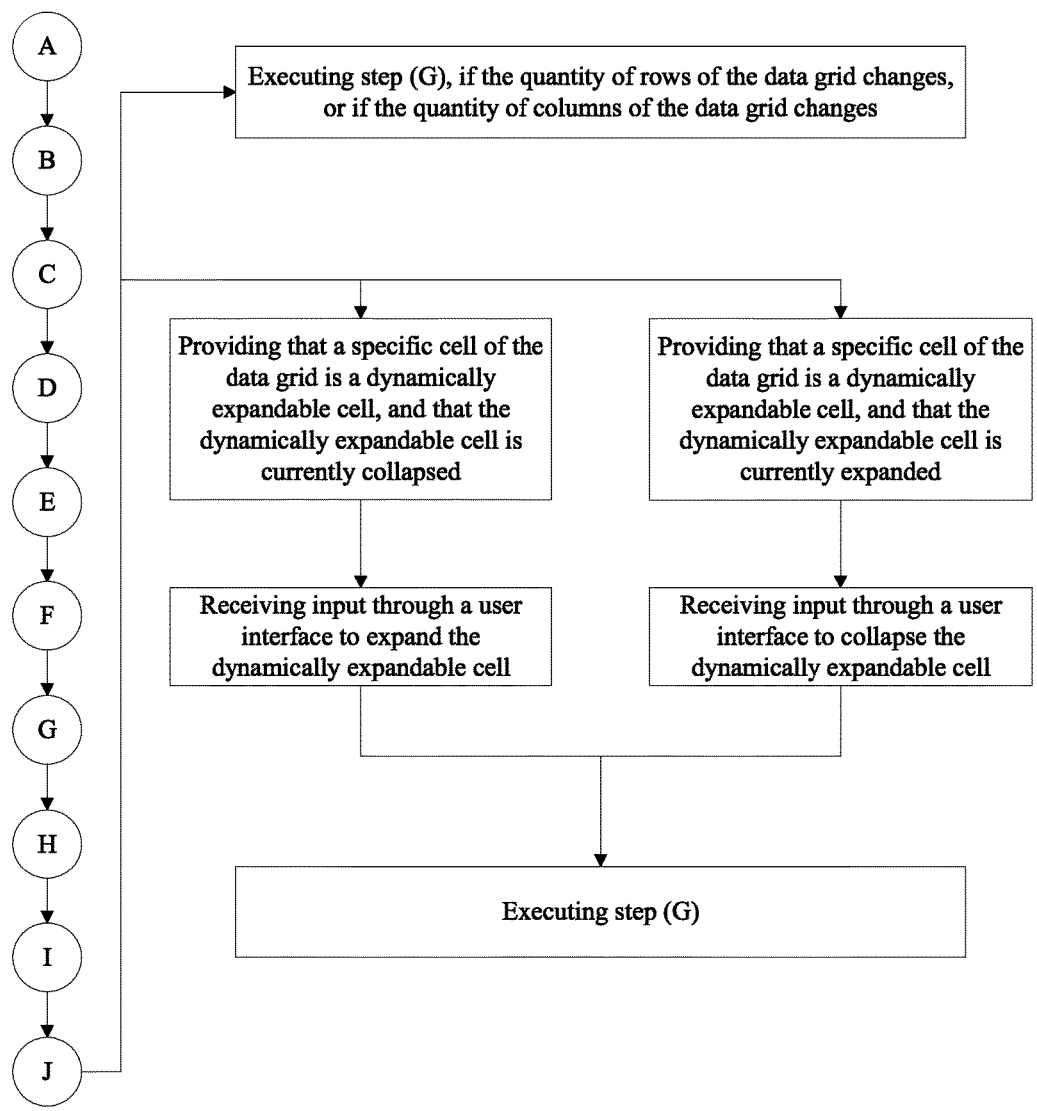
FIG. 6 is a stepwise flow diagram showing additional steps for expanding and collapsing dynamically expandable cells in a data grid.

Referring to FIG. 6, in particular, step (G) is executed if the quantity of rows of the data grid changes, or if the quantity of columns of the data grid changes. If a specific cell of the data grid is a dynamically expandable cell, a user may input a selection through the user interface to expand the dynamically expandable cell. If input is received to expand the dynamically expandable cell, step (G) is executed. If input is received to collapse the dynamically expandable cell, step (G) is subsequently executed to ensure proper layout of the report.

In addition to cells in a data grid, a report may also allow dynamically expandable data containers. A dynamically expandable data container may be expanded to show further data containers or data elements, which take up additional space on the report and for which other elements must be moved to accommodate. Similar to the above description for cells in a data grid, every time a dynamically expandable data container is either expanded or collapsed, the re-layout process of step (G) is re-applied to maintain proper layout.

In the preferred embodiment of the present invention, cell formatting is maintained when re-layout of data elements within a data grid is performed. This is important to preserving context in the report, since different elements of the report may be formatted in different ways (such as, but not limited to, font type, weight, size, color, and alignment)

The data grid may also have 0 or more levels of row groups, or row spans. If the row has a row group the column data row is added to the row group at the lowest visible level. If a row group column is removed, the entire row group (all rows) is moved to the column data row. By default, column data rows should be not visible and there should be an icon or indicator to allow the user to expand ad collapse each data row.

Although the invention has been explained in relation to its preferred embodiment, it is to be understood that many other possible modifications and variations can be made without departing from the spirit and scope of the invention as hereinafter claimed.

What is claimed is:

1. A method of automatically re-organizing structured data in a reporting system based on screen size by executing computer-executable instructions stored on a non-transitory computer-readable medium comprises the steps of:
   (A) providing a report definition, wherein the report definition defines a plurality of data containers, and wherein the report definition provides instructions for spatially arranging the data containers on a visual medium;
   (B) retrieving layout coordinates for a display device, wherein the layout coordinates delineate display boundaries on the display device, and wherein the layout coordinates comprise a right display edge value;
   (C) calculating initial container coordinates for each of the data containers from the report definition, wherein the initial container coordinates for each of the data containers comprise an initial left container edge value, an initial right container edge value, an initial top container edge value and an initial bottom container edge value;
   (D) comparing the initial container coordinates for each of the data containers to the layout coordinates in order to find an obscured container, wherein the initial right container edge value of the obscured container exceeds the right display edge value;
   (E) checking for an adjacent container from the plurality of data containers, wherein the initial right container edge value of the adjacent container is less than the initial left container edge value of the obscured container, and wherein there is vertical overlap between the obscured container and the adjacent container;
   (F) moving the obscured container below the adjacent container, if the adjacent container is found;
   (G) repeating steps (D) through (F) starting with the rightmost data containers until an obscured container is not found, or until an adjacent container is not found left of an obscured container;
   (H) identifying one of the data containers as a data grid, wherein the data grid comprises a plurality of data elements arranged in a plurality of rows and a plurality of columns, wherein each of the columns may be associated with a column header, and wherein each data element is associated with one of the rows from the plurality of rows and one of the columns from the plurality of columns;
   (I) removing a specified column from the data grid if an obscured column is found from the plurality of columns, wherein a column is obscured if the column is positioned right of the right display edge value; and
   (J) adding a specific data element from the plurality of data elements of the obscured column into a relocated element container below a respective row from the plurality of rows, wherein the specific data element is associated with the respective row.

2. A method of automatically re-organizing structured data in a reporting system based on screen size by executing computer-executable instructions stored on a non-transitory computer-readable medium as claimed in claim 1 comprises the steps of:
   checking for a lower container below the adjacent container, wherein the initial top container edge value of the lower container is greater than the initial lower container edge value of the adjacent container; and moving the lower container down in order to accommodate the obscured container being moved beneath the adjacent container, if the lower container is found.

3. A method of automatically re-organizing structured data in a reporting system based on screen size by executing computer-executable instructions stored on a non-transitory computer-readable medium as claimed in claim 1 comprises the steps of:

providing that an arbitrary data container comprises a plurality of data elements;

checking if any of the data elements of the arbitrary data container are obscured, wherein part of an obscured element is past the right display edge boundary;

checking for an adjacent element, wherein the adjacent element is left of the obscured element;

moving the obscured element below the adjacent element, if an initial top element edge value of the obscured element is greater than an initial top edge element value of the adjacent element; and moving the obscured element above the adjacent element, if the initial top element edge value of the obscured element is less than the initial top edge element value of the adjacent element.

4. A method of automatically re-organizing structured data in a reporting system based on screen size by executing computer-executable instructions stored on a non-transitory computer-readable medium as claimed in claim 1 comprises the step of:

adding a column header of the specific column adjacent to the specific data element below the respective row.

5. A method of automatically re-organizing structured data in a reporting system based on screen size by executing computer-executable instructions stored on a non-transitory computer-readable medium as claimed in claim 1 comprises the steps of:

analyzing the column headers of the data grid in order to identify at least one important column and at least one less important column from the plurality of columns; and removing a less important column left of an obscured important column from the at least one important column as the specified column, if the obscured important column is found.

6. A method of automatically re-organizing structured data in a reporting system based on screen size by executing computer-executable instructions stored on a non-transitory computer-readable medium as claimed in claim 5 comprises the steps of:

providing column metadata for each of the columns; and
comparing the column metadata of each of the columns in order to identify the at least one important column and the at least one less important column.

7. A method of automatically re-organizing structured data in a reporting system based on screen size by executing computer-executable instructions stored on a non-transitory computer-readable medium as claimed in claim 5 comprises the steps of:

providing a column header importance guessing algorithm; and identifying the at least one important column and the at least one less important column using the column header importance guessing algorithm.

8. A method of automatically re-organizing structured data in a reporting system based on screen size by executing computer-executable instructions stored on a non-transitory computer-readable medium as claimed in claim 1 comprises the steps of:

receiving input through a user interface to expand the respective row;

showing the relocated element container below the respective row on the user interface;

moving a plurality of lower rows from the plurality of rows from an original position to a relocated position in order to accommodate the relocated element container, wherein the lower rows are rows below the respective row, and wherein the relocated position is lower than the original position;

executing step (G).

9. A method of automatically re-organizing structured data in a reporting system based on screen size by executing computer-executable instructions stored on a non-transitory computer-readable medium as claimed in claim 1 comprises the steps of:

receiving input through a user interface to collapse the respective row;

removing the relocated element container from the user interface;

moving a plurality of lower rows from the plurality of rows from a relocated position to an original position, wherein the lower rows are rows below the respective row, and wherein the relocated position is lower than the original position; and executing step (G).

10. A method of automatically re-organizing structured data in a reporting system based on screen size by executing computer-executable instructions stored on a non-transitory computer-readable medium as claimed in claim 1 comprises the step of:

executing step (G), if the quantity of rows of the data grid changes, or if the quantity of columns of the data grid changes.

11. A method of automatically re-organizing structured data in a reporting system based on screen size by executing computer-executable instructions stored on a non-transitory computer-readable medium as claimed in claim 1 comprises the steps of:

providing that a specific cell of the data grid is a dynamically expandable cell, and that the dynamically expandable cell is currently collapsed;

receiving input through a user interface to expand the dynamically expandable cell, wherein expanding the dynamically expandable cell either adds rows, columns, or both to the data grid; and executing step (G).

12. A method of automatically re-organizing structured data in a reporting system based on screen size by executing computer-executable instructions stored on a non-transitory computer-readable medium as claimed in claim 1 comprises the steps of:

providing that a specific cell of the data grid is a dynamically expandable cell, and that the dynamically expandable cell is currently expanded;

receiving input through a user interface to collapse the dynamically expandable cell, wherein collapsing the dynamically expandable cell removes either rows, columns, or both from the data grid; and executing step (G).

* * * * *